HENRY W. STOW.
Improvement in Carriage-Hubs.

No. 114,364.  Patented May 2, 1871.

Witnesses.
W. G. Henderson
Edmund Masson

Henry W. Stow
By atty A. B. Stoughton.

United States Patent Office.

HENRY W. STOW, OF NEW HAVEN, CONNECTICUT.

Letters Patent No. 114,364, dated May 2, 1871.

IMPROVEMENT IN CARRIAGE-HUBS.

The Schedule referred to in these Letters Patent and making part of the same.

*To all whom it may concern:*

Be it known that I, HENRY W. STOW, of New Haven, in the county of New Haven and State of Connecticut, have invented certain new and useful Improvements in the Construction of Carriage-Hubs; and I do hereby declare the following to be a full, clear, and exact description of the same, reference being had to the accompanying drawing making a part of this specification, in which—

Similar letters of reference, where they occur in the separate figures, denote like parts of the hub in the drawing.

I am aware that carriage-hubs have been made of connected flanges combined with a mortised wooden hub or center. To this I lay no claim.

My invention consists in the construction of my combined metal and wooden-cored hub, as will be hereinafter particularly described.

Figure 1:
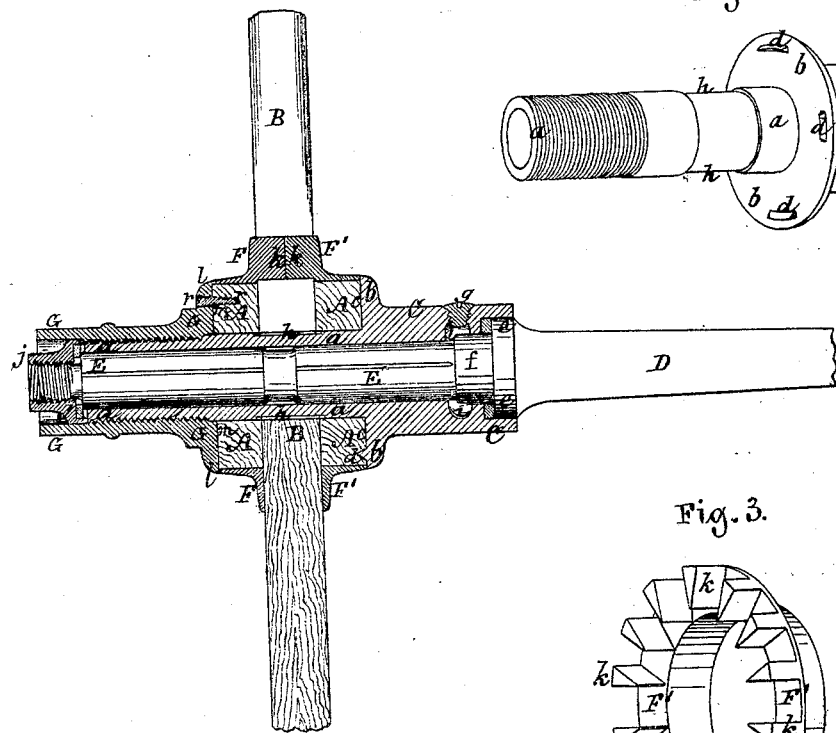
Figure 1 represents a section through the hub and its connection with the journal of the axle on which it is to be used.
Figure 2:
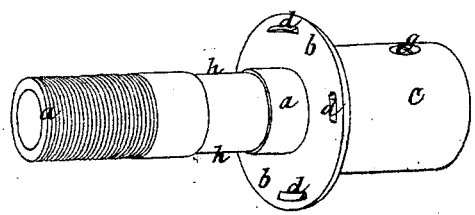
Figure 2 represents, in perspective, that part of the hub in which the journal-box is made, and to which the other parts of the hub are held.
Figure 3:
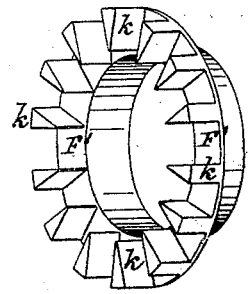
Figure 3 represents, in perspective, one of the metal flanges of the hub.
Figure 4:
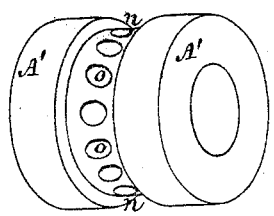
Figures 4 and 5 represent modifications of the wooden core and spokes and manner of uniting them.
Figure 5:
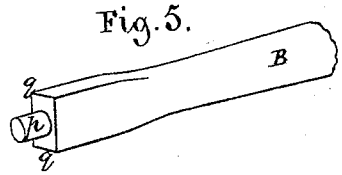

A, fig. 1, represents a wooden core, which is bored out to receive the journal-box, and into which the spokes B are mortised. This wooden core is completely surrounded or incased in the metal portions of the hub.

The heel C of the hub and the journal-box $a\ a$ are cast in one piece, and on the part C there is cast a flange, $b$, which bears against and covers the inner face $c$ of the wooden core A, and which may also have spurs $d$ cast or otherwise formed in or on it, to take into the wood of the core.

In the rear of this heel-piece C is formed a recess for receiving the collar $e$ on the axle D, as also the larger portion $f$ of the journal E on said axle.

There may be also formed in this part or portion C an oil-chamber, $i$, into which the lubricating material may be put through an opening covered by a screw, $g$, or otherwise.

A packing-ring of any suitable flexible or elastic material may be interposed between the recess and the collar $e$, to prevent the oil from wasting out.

That portion of the exterior of the journal-box which is under the line of the spokes, as at $h$, is recessed so that the ends of the tenons of the spokes may not touch or bear thereon; and on the point of the journal E, and bearing against the end of the journal or pipe-box, is the nut $j$, which holds the hub to the journal.

F F are ringed flanges, having projections $k$ thereon, with perfectly parallel sides, so as to receive and hold a spoke similarly formed, and which extend midway between the spokes, and there abut or nearly so against each other, and take in the lower ends of the spokes and completely incase or encompass the perimeter of the wooden core A.

The point of the hub G is in a separate piece, and has upon it a flange, $l$, which bears against the front side $m$ of the core as well as against the ringed or rimmed flange F on that side of the hub, as the flange $b$ does on the opposite side.

A long screw-thread is cut on the forward end of the pipe or journal-box $a$, and a female screw-thread is cut in the inside of the part G so as to screw over the pipe-box $a$.

Instead of square tenons on the spokes and similarly-shaped mortises in the wooden core, I can and propose to use a wooden core such as shown at A', with a groove, $n$, cut in its perimeter, and with round holes $o\ o$ in it to receive round tenons $p$ on the spokes, and the shoulders $q$ on said spokes to fit snugly within the groove $n$.

The metal portions, as shown and described in the other figures and in the above description, are then applied to this grooved wooden core in a similar way; so that the hub is in reality an iron or metallic hub, with a wooden-core piece to receive the inner ends of the spokes, the advantages of which connection of "wood and wood" are well known.

To put this hub together, proceed as follows:

The spokes being first let into the wooden core, the flange F' is placed thereon, and the portion $a\ a$ of the heel C of the hub is slipped through said core until its flange $b$ abuts against the flange F'. Then the flange F is slipped onto the forward side of the hub, and the point G of the hub is run up over or on the screw-thread on the pipe or box $a$ until its flange $l$ comes up against the flange F; and by continuing to screw up this piece G the other metallic pieces are brought up tight against each other and against the wooden core and heels of the spokes, making the whole compact and very firm, and with all the advantages of the wood and metal, and without any of the disadvantages of hubs purely wooden or metallic.

The flanges in my case are not connected by bolts or rivets, and yet they afford great strength to the spokes and finish to the hub.

A screw or screws, $r$, may pass through the flange $l$ into the core A to prevent the point G from backing on the screw-thread of the pipe or box $a$.

Having thus fully described my invention,

What I claim therein as new, and desire to secure by Letters Patent, is—

In combination with the wooden core and spokes set therein, the flanges F F, and heel-piece C, and point G, united to each other and to the wooden portions, substantially as described and represented.

HENRY W. STOW.

Witnesses:
LOUIS H. BRISTOL,
WM. B. BRISTOL.